United States Patent

Geng

[11] Patent Number: 6,138,575
[45] Date of Patent: Oct. 31, 2000

[54] FLOOR TRANSPORT SYSTEM WITH RAIL-MOUNTED FLOOR TRANSPORT VEHICLES

[75] Inventor: Manfred Geng, Grenzach, Germany

[73] Assignee: AFT Automatisierungs- und Fördertechnik GmbH, Schopfheim, Germany

[21] Appl. No.: 08/995,741

[22] Filed: Dec. 22, 1997

Related U.S. Application Data

[60] Provisional application No. 60/065,691, Nov. 18, 1997.

[30] Foreign Application Priority Data

Dec. 23, 1996 [DE] Germany ............................ 196 54 080

[51] Int. Cl.[7] ................................................... B60M 1/34
[52] U.S. Cl. ..................... 104/140; 104/172.3; 104/288; 191/23 R
[58] Field of Search .................................... 104/140, 143, 104/144, 145, 172.3, 288; 191/23 R

[56] References Cited

U.S. PATENT DOCUMENTS

| 4,438,701 | 3/1984 | Murai et al. ............................ 104/140 |
| 5,134,940 | 8/1992 | Fujita et al. ............................ 104/140 |

FOREIGN PATENT DOCUMENTS

| 0 151 982 A3 | 8/1985 | European Pat. Off. . |
| 0 616 933 A1 | 9/1994 | European Pat. Off. . |
| 25 42 682 A1 | 4/1977 | Germany . |
| 80 06 087 U | 7/1980 | Germany . |
| 43 09 009 A1 | 9/1994 | Germany . |

Primary Examiner—Robert J. Oberleitner
Assistant Examiner—Robert J. McCarry, Jr.
Attorney, Agent, or Firm—Henry M. Feiereisen

[57] ABSTRACT

A floor transport system with a rail guided floor transport vehicle and a guide rail system is recessed in the floor or ground plane and has a slotted track channel for guiding the vehicle along a travel path and at least two current conductors. At least two running wheels and at least one drive wheel as well as guide elements sliding in the track channel and current collector shoes are secured to the frame of the vehicle and operatively connected to at least one drive unit which is secured to the vehicle frame and includes the drive wheel. The front guide elements and preferably also the current collector shoes are combined in particular subassemblies which can rotate about respective vertical axes, wherein at least one of the subassemblies is mechanically and electrically linked to a respective drive unit for steering the vehicle.

20 Claims, 12 Drawing Sheets

FLOOR TRANSPORT SYSTEM WITH RAIL-MOUNTED FLOOR TRANSPORT VEHICLES

CROSS-REFERENCES TO RELATED APPLICATIONS

This application claims benefit of prior filed copending provisional application Appl. No. 60/065,691, filed Nov. 18, 1997.

BACKGROUND OF THE INVENTION

The present invention refers to a floor transport system with rail-mounted floor transport vehicles.

Typically, floor transport vehicles travel along slotted rail channels having built-in current conductors for providing electrical power. Each vehicle includes a guide mechanism and a current collector mechanism and at least one drive unit for traveling on a rail system made from guide rails which are recessed in the floor or ground plane and manufactured from an abrasion-resistant material. The rail system has a slotted track path for guiding the floor transport vehicles, and at least two current conductors for supplying power. The floor transport vehicles are moveable on at least two running wheels and have guide elements sliding in the slotted track channel of the guide rail as well as current collector shoes which interact with at least one drive unit rotatably mounted in the forward area of the vehicle frame about a vertical steering axis and including at least one drive wheel driven by a motor.

Floor transport systems of this type are disclosed e.g. in German Pat. No. 25 42 682 A1, European Pat. Nos. 0 151 982 A3 and 0 616 933 A1. Conventional floor transport systems with floor transport vehicles of this type are mainly used inside buildings, preferably in manufacturing and storage facilities, for transporting, for example, larger workpieces or bulky goods. Further applications of such transport systems with floor transport vehicles include assembly lines in the manufacture of e.g. motor vehicles. The rails with the current conductors are recessed, but flush with the floor level, so that the wheels of vehicles which are not restricted to rails, e.g. bicycles, can run across the rails without being thrown off balance or getting bumped.

With the more widespread use of floor transport systems of this type, there is a need to satisfy the requirements of different applications. Some conventional systems are not optimally suited for special or difficult applications. In some applications, vehicles have to be able to move in both directions. For in hauling material over short distances between successive automatic or manual machining operations, in particular with heavy workpieces, it can be troublesome if the drive wheel(s) traverse(s) the slotted track channel at a very acute angle. The rubber tires of the drive wheels can then be severely deformed by the edges of the slotted track channel, and especially the current conductors and the material in which the slotted track channel and the current conductors are embedded, can be damaged if, for example, foreign objects are pressed into the material. Moreover, dirt can impair the functionality of the current conductors.

SUMMARY OF THE INVENTION

It is thus an object of the present invention to provide an improved floor transport system, obviating the afore-stated drawbacks.

In particular, it is an object of the present invention to provide an improved floor transport system in conjunction with conventional rail systems for attaining an advanced design concept for floor transport vehicles wherein the basic concept of a variable size vehicle frame can be combined with a variety of chassis designs and rail layouts, so that a rail system with branch lines can be designed for confined spaces and more closely spaced manufacturing and installation operations.

It is another object of the invention to better adapt the system to the existing operating conditions by simplifying and standardizing the technology, while at the same time maintaining a high level of operational safety and reliability and reducing the risk of accidents.

These objects and others which will become apparent hereinafter are attained in accordance with the present invention by a floor transport system with floor transport vehicles, including in the front section of the vehicle frame—as viewed in travel direction—guide elements sliding in the slotted track channel and combined with current collector shoes secured to the vehicle frame to form a special subassembly in the form of a forward guide and current collector unit capable of rotating about its steering axis, wherein the rear section of the vehicle frame—as viewed in the travel direction—includes another trailing subassembly having guide elements sliding in the slotted track channel and, optionally, current collector shoes to form a trailing guide and current collector unit which coincides with the longitudinal center axis of the vehicle frame.

This design which includes two front and rear guide and current collector units in the form of individual subassemblies have several practical advantages. These self-contained units can be easily removed and installed for maintenance. Moreover, the floor transport vehicle can be moved forwards and backwards or driven by a motor. With this design, the rotatable front—and the rotatable rear—guide and current collector unit can furthermore be combined with a respective drive unit to a one-piece subassembly or can be constructed as two pieces, whereby the steering motion of the respective guide and current collector unit is then transmitted mechanically through a linkage to the drive unit which is rotatable about a respective vertical axis.

Since several different units can be combined with this design, a number of different embodiments are possible:

In a first embodiment, the leading guide and current collector unit is combined with the drive unit to form a single aggregate.

In a modified embodiment, in the rear section of the vehicle frame, there is disposed a rear drive subassembly which is supported by a ball turning disk for rotation about the vertical support axis and which includes in combination a rear guide and current collector unit with associated guide elements and current collector shoes and a drive unit comprising a drive motor, a transmission and the drive wheels connected to the transmission to form a single subassembly.

This embodiment combines several advantages, in particular, because the transport vehicle can be used in both travel directions and for rather large and heavy workpieces and items, respectively. With the forward and reverse movements, precision machining operations can advantageously be carried out in confined spaces.

In another modification of the invention, the guide and current collector unit including guide elements and current collector shoes is formed as a special subassembly and can rotate about its steering axis in the front section of the vehicle frame, with the subassembly having a pole arm extending forwardly in the travel direction and a steering lever extending in opposition to the travel direction in prolongation of the pole arm for articulation via a transverse link to a control rod which is rigidly connected to a drive unit which is in offset disposition at the forward area of the vehicle frame transversely relative to the longitudinal center axis by a certain value and rotatable about a respective vertical support axis. Advantageously, the extent of offset of the drive unit with respect to the longitudinal center axis is the same as the length of the transverse link pivotally connected on both sides to the steering lever and the control rod, respectively, thereby forming a parallelogram steering system.

This embodiment of the steering arrangement and the drive unit prevents the rubber tires of the drive wheels from traversing the slotted track channel during tight turns, thereby prolonging the life of the tire wheels—in particular at high vehicle loads.

It is furthermore advantageous if the pole arm has at least one guide element which slides in the slotted track channel, and a proximity sensor disposed on the tip of the pole arm for generating a control signal before a collision with an obstacle or with a preceding transport vehicle is imminent. The tip of the pole arm can be so constructed as to be able to move rearwardly against a spring bias force from a normal position on the pole arm which is secured to a telescoping support arm. The support arm may also have a round tubular profile, with the spring action generated by a coil spring.

For remote control of the vehicle, the guide element is formed as an elongated slider block, supported for rotation about a vertical axis or for lateral adjustment, and provided with a remote-controllable rotary or linear drive.

The pole arm, preferably the tip of the pole arm, as well as the guide and current collector units, are each provided with at least one guide element formed as an elongated slider block which engages in the slotted track channel and is rotatable or laterally moveable.

The above measures ensure a high degree of stability and accuracy of the travel path. Moreover, the modular design of the vehicle allows the vehicle and the drive to be inspected quickly in the event of a malfunction, and the drive unit and/or the pole arm unit or both units together can be easily exchanged when spare parts are available. In this way, the operation does not have to be interrupted and down times are minimized.

In accordance with another improved embodiment of the invention, the guide and current collector unit with the guide elements and current collector shoes, which is formed as a special subassembly and rotatable about its steering axis in the front section of the vehicle frame, is provided with a pole arm extending forwardly in the travel direction, wherein the front section of the pole arm is provided with at least one guide element slideably guided in the slotted track channel and with a proximity sensor disposed on the tip of the pole arm for generating a control signal before a collision with an obstacle or with a preceding transport vehicle is imminent, wherein the guide and current collector unit further includes a steering lever oriented in opposition to the travel direction and forming an extension of the pole arm, with the steering lever being articulated via a transverse link to a control rod which also extends in opposition to the travel direction and is rigidly affixed to a drive unit which is offset transversely relative to the longitudinal center axis by a certain amount and which can rotate about a respective vertical support axis, with the drive unit including a drive motor, a transmission and drive wheels connected to the transmission.

The so designed transport vehicle substantially unites most of above combination elements and thus represents a fully optimized configuration for enabling the vehicle to be used and expandable in a number of ways. In an additional improvement, the trailing subassembly with the guide and current collector unit which is located in the rear vehicle section, can be combined with a separate drive unit to form an aggregate, as has already been described above in conjunction with another embodiment.

With these features, the guide elements can advantageously be rotated or displaced laterally by remote control. A guide element of this type which engages in the slotted track channel, can not only be secured to the tip of the pole arm, but also to a prolongation of the pole arm oriented rearwardly, thereby enabling the vehicle to move opposite to the travel direction.

Moreover, in tight turns, each remote-controlled vehicle can follow any travel path selected. Conventional rail switches with switch tongue are not required. The guide element can find and follow the open channel of a tongueless rail switch which is preset by a controller, in that the guide element contacts the switch laterally and can be rotated in both directions and/or be displaced laterally.

This arrangement of the pole arm improves the operational safety, in that the tip of the pole arm which is lower in height than the vehicle frame, retracts when the pole arm makes contact or collides with any obstacle in the travel path, such as a board or a beam or a similar resistance pushing against the chassis, unless the proximity sensor disposed on the tip of the pole arm has already generated a control signal indicating the vehicle malfunction and bringing the vehicle to a halt, if necessary.

According to another feature, the floor transport vehicle includes a number of wheels, such as—in addition to the drive wheels—running wheels disposed on both sides proximate to the rear side frame. Moreover, two front support wheels which are not driven, can be attached to the vehicle frame on both sides at a distance to the drive wheel in an area of the lateral boundary of the vehicle frame.

According to another useful feature, the drive unit includes on both sides spaced-apart drive wheels which are coupled through floating axles to the transmission which has incorporated therein a differential.

The vehicle frame is preferably constructed as a substantially rectangular frame, to which the drive unit, the guide and current collector units, but possibly also the pole arm unit with the steering linkage and the support for the support wheels, including the adjustment devices therefor, are releasably attached.

According to another feature, a plate link chain is advantageously secured to the vehicle frame or to the rear guide and current collector unit, wherein the plate link chain is inserted and dragged in the slotted track channel and has a rectangular cross section matching the cross section of the track channel. The plate link chain is made from plastic links, wherein the link bolts are guided in the link plates in elongated holes located on both sides and closed by lateral cover plates, with the chain being terminated with a steel end member.

It is the function of the drag chain to prevent a collision or contact between two sequential floor transport vehicles. If a trailing floor transport vehicle approaches a preceding floor transport vehicle closer than a safe distance, then the proximity sensor of the following floor transport vehicle makes contact with the drag chain, thereby generating a control signal which can be processed in several ways. The trailing floor transport vehicle can thus be stopped or its speed can be decreased.

The dragged chain is also prevented from being lifted or pushed up from the slotted track channel, if the trailing floor transport vehicle contracts the chain to some degree, since the length of the chain can be significantly decreased without being pushed up as a consequence of guiding the link bolts in oblong holes.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
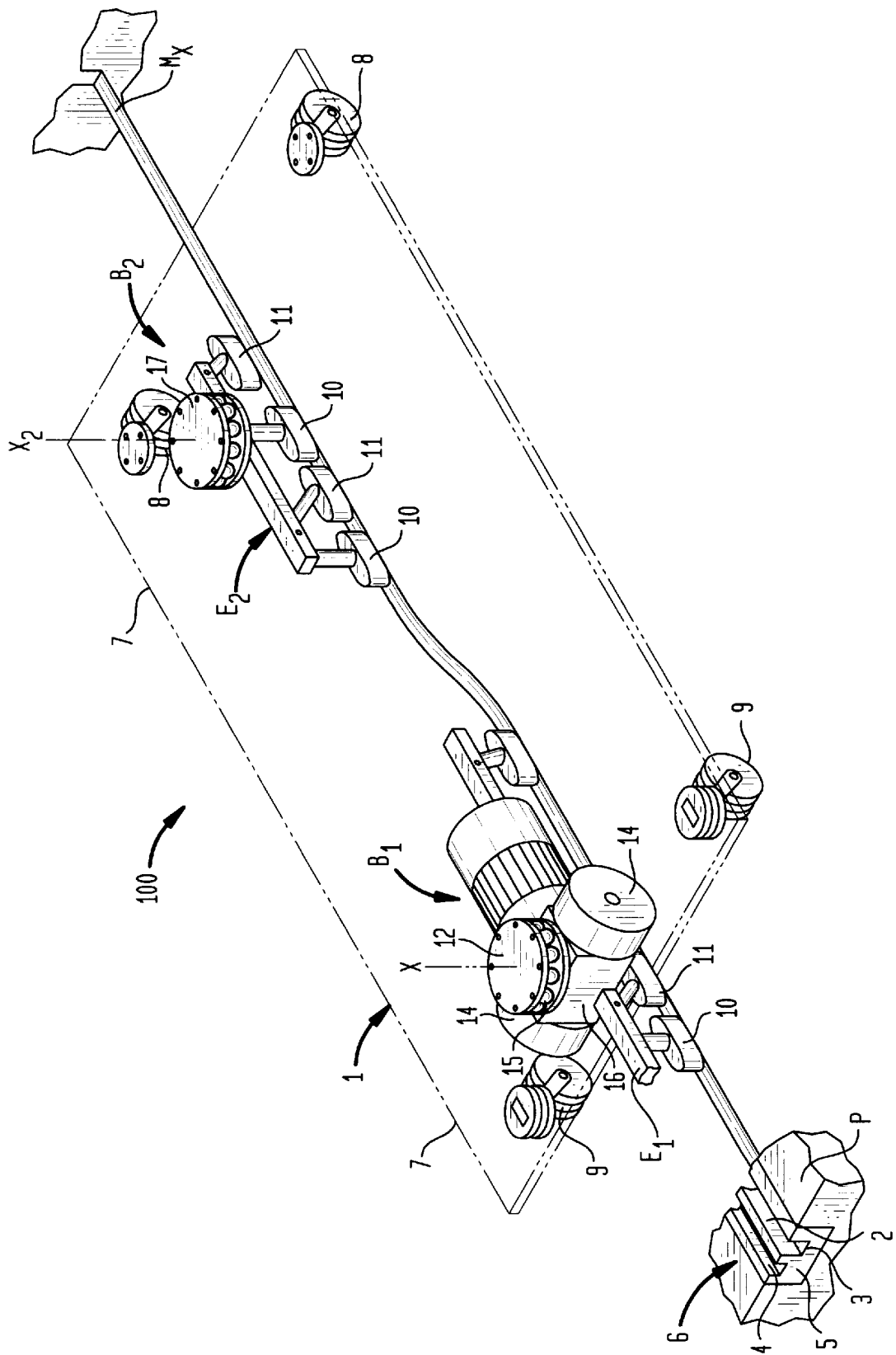
FIG. 1 is a schematic, perspective view of a first embodiment of a floor transport system according to the present invention.

Throughout all the Figures, the same or corresponding elements are generally indicated by same reference numerals.

Figure 14:
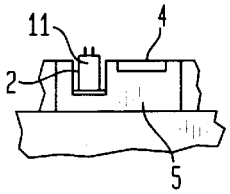
FIG. 14 is a front view of a guide rail assembly.
Figure 15:
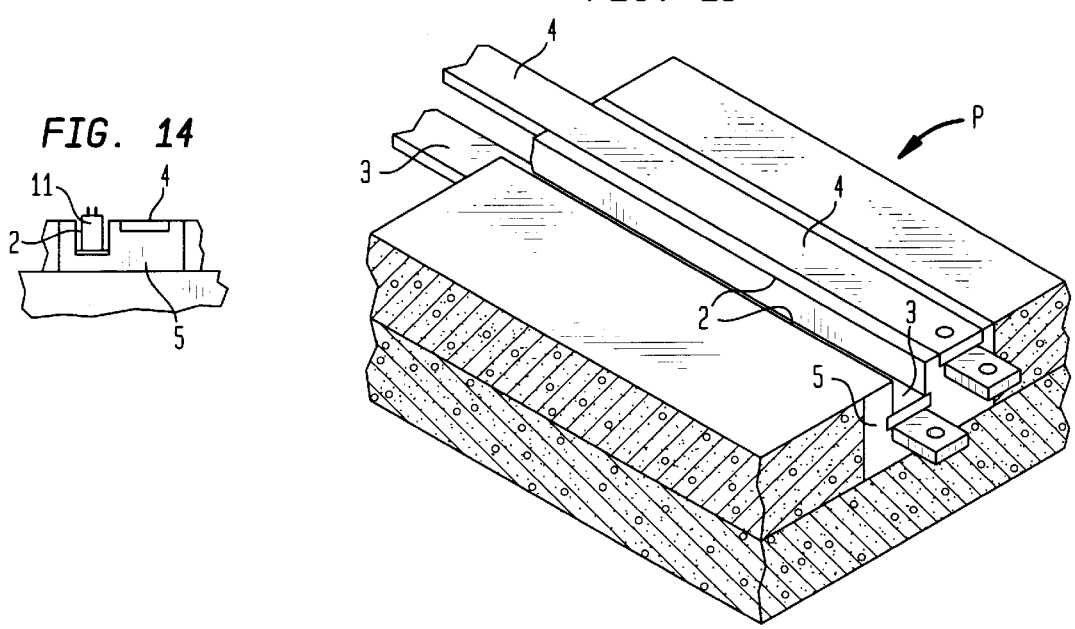
FIG. 15 is a perspective, fragmentary view of a form part with incorporated slotted track channel.

Turning now to FIG. 1, there is shown a schematic, perspective view of a first embodiment of a floor transport system according to the present invention, generally designated by reference numeral 100. Reference character P denotes a floor and ground plane in which a form member 5 is embedded, having formed therein a slotted track channel 2. Recessed in the bottom of the slotted track channel 2 is a current conductor 3. A second current conductor 4 is placed at a small distance from the current conductor 3 in the form member 5 in such a way that its surface is flush with the floor and ground plane P, as best seen in FIGS. 14 and 15. The form member 5 together with the slotted track channel 2 and the current conductors 3 and 4, form together a guide rail assembly, generally designated by reference numeral 6, for guiding a floor transport vehicle 1 which is shown only by way of its vehicle frame 7 for sake of simplicity because the structure of the vehicle frame 7 may vary depending on the application of the vehicle. The vehicle frame 7 is supported for mobility on rear running wheels 8 and leading support wheels 9 disposed in a manner best seen in FIG. 2.

The floor transport system 100 includes a special (front) subassembly $B_1$ which is exchangeably secured to the vehicle frame 7 in the longitudinal center axis $M_x$, and includes a front guide and current collector unit $E_1$ which is equipped with guide elements 10 and current collector shoes 11. The guide elements 10 engage in the slotted track channel 2 and define the travel path. For most applications, the guide elements 10 are designed to be tiltable about a vertical axis by remote control about a small tilt angle so as to be able to enter the desired rail branch line at the tongue-less switches.

The floor transport system 100 further includes a rear subassembly $B_2$ which is secured exchangeably to the rearward portion of the vehicle frame 7 on the longitudinal center axis Mx of the vehicle and is equipped with a rear guide and current collector unit $E_2$ which includes guide elements 10 sliding in the guide rail assembly 6 and the current collector shoes 11. The rear subassembly $B_2$ is connected to the vehicle frame 7 by way of a ball turning disk 17 for rotation about the vertical pivot axis $x_2$.

Figure 3:
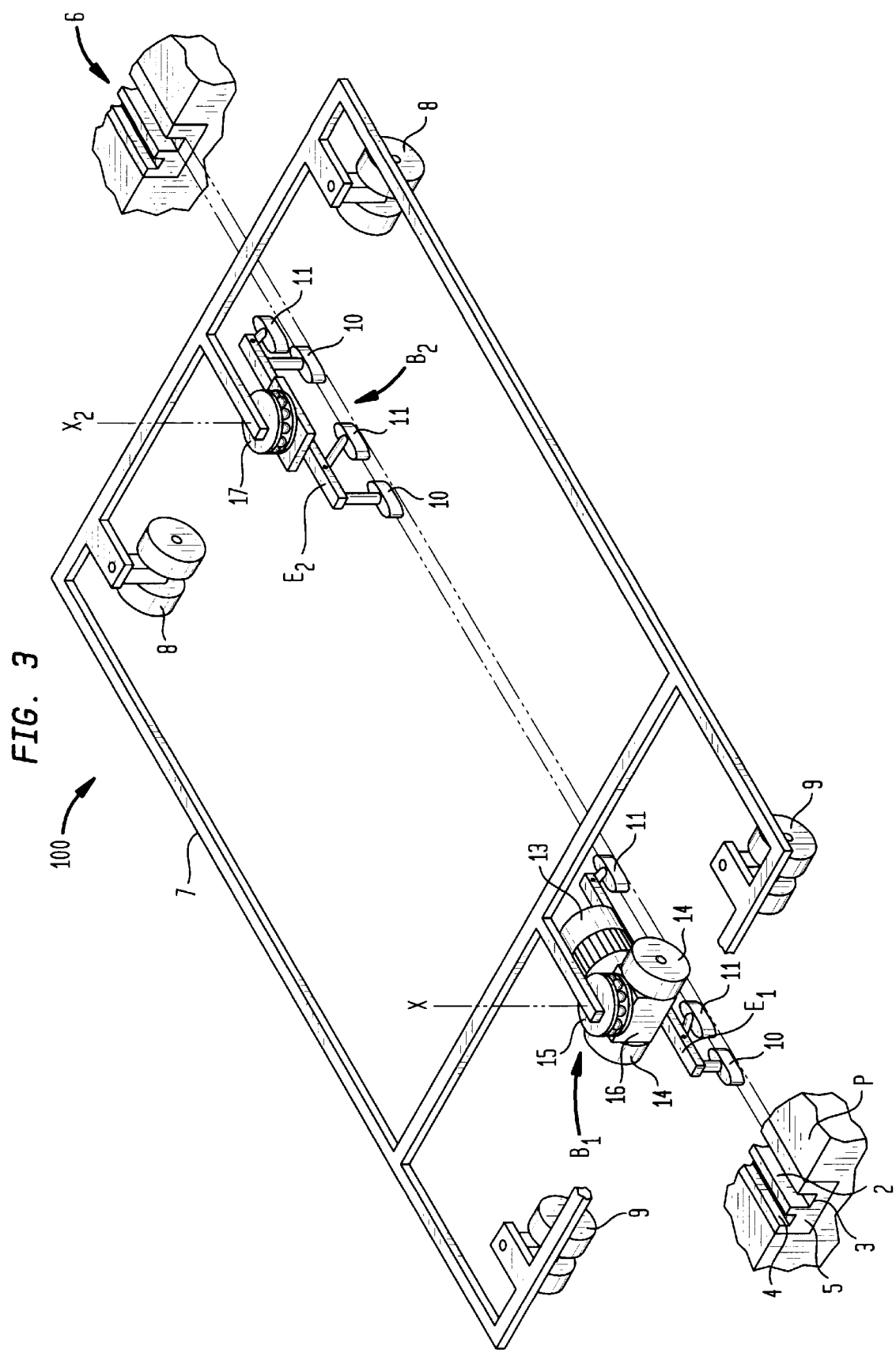
FIG. 3 is a schematic, perspective view of the floor transport system according to the present invention, showing in more detail the vehicle frame.

FIG. 3 shows a schematic, perspective illustration of the floor transport system with the vehicle frame shown in solid lines and suitably connected to the subassemblies $B_1$ and $B_2$.

As further shown in FIGS. 1 and 3, the leading subassembly $B_1$. of the floor transport system 100 is combined with a drive unit 12 to form a single aggregate which is supported by a ball turning disk 15 for rotation about the vertical steering axis x The drive unit 12 essentially includes a drive motor 13, a transmission 16 and running wheels 14 attached on both sides to the transmission 16.

Figure 16:
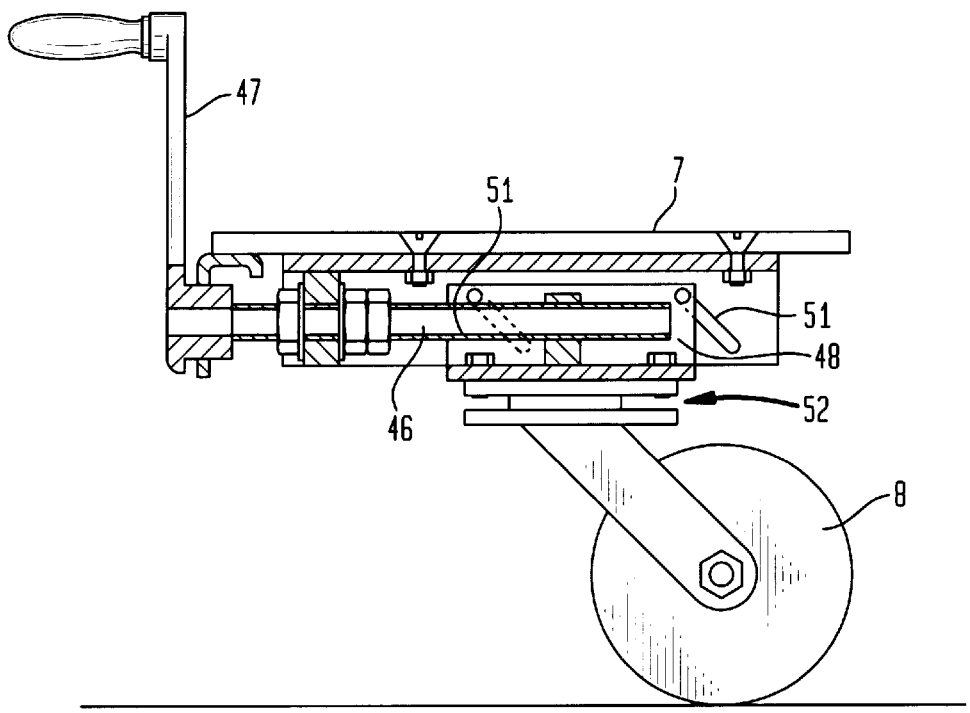
FIG. 16 is a partial cross section of a running wheel arrangement.
Figure 17:
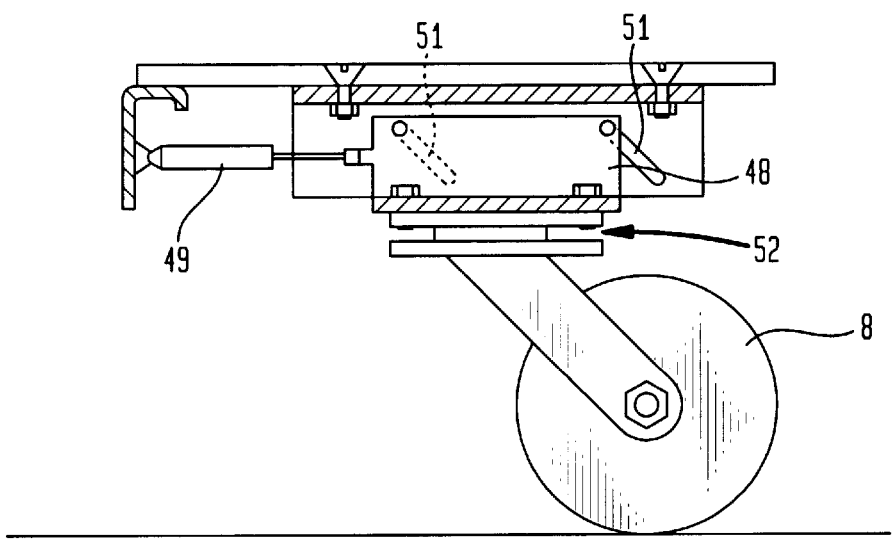
FIG. 17 is a modified embodiment of a running wheel arrangement of FIG. 16.

In the embodiment of the floor transport system 100 shown in FIGS. 1 to 3 and in the embodiments of a floor transport system as shown in FIGS. 5 to 9 and described further below, the running wheels 8 support the load carried on the vehicle frame 7, on the floor and ground plane P, while the support wheels 9 are only intended to support a small fraction of the load carried on the front section of the vehicle frame, since the running wheels, in order to transmit their torque to the floor and ground plane P, must be sufficiently weighted. Consequently, the support wheels 9 can be vertically adjusted by a small amount such as to conform to the respective load conditions. Preferred embodiments of these possibilities for adjustment are illustrated in FIGS. 16 and 17.

Figure 4:
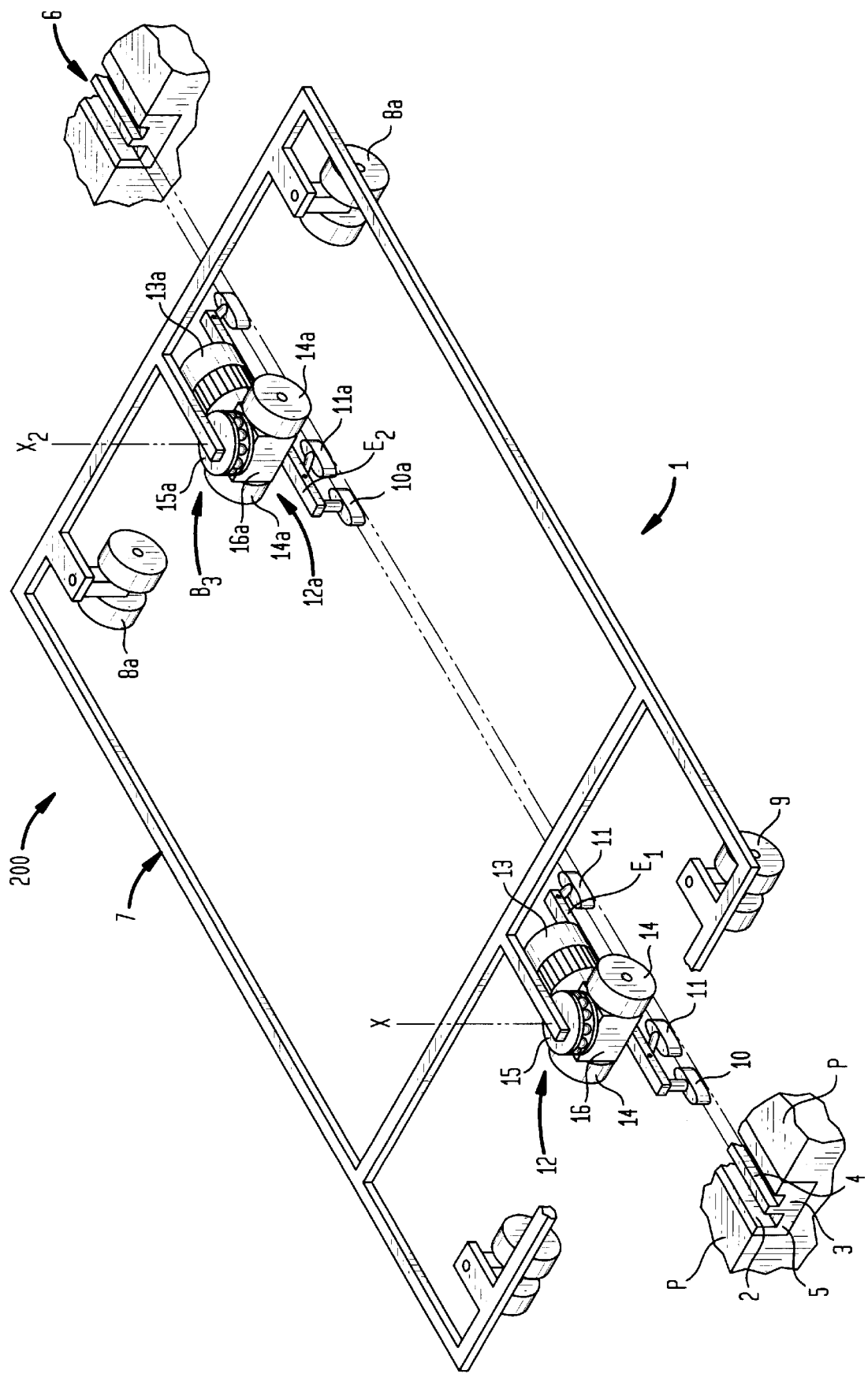
FIG. 4 is a schematic, perspective view of a second embodiment of a floor transport system according to the present invention.

FIG. 4 shows a modified floor transport system according to the present invention, generally designated by reference numeral 200 which differs from the floor transport system 100 in the configuration of the rear running wheels which are also vertically adjustable for providing an adjustment for the contact pressure of the running wheels 8a with respect to the drive wheels 14a. Moreover, the floor transport vehicle 200 includes a rear drive subassembly $B_3$ which includes a second drive motor 13a, a transmission 16a and two drive wheels 14a which are attached on both sides to the transmission 16a and are supported for rotation by a ball turning disk 15a. Connected to the drive subassembly $B_3$ is a rear guide and current collector unit $E_2$ which includes guide elements 10a traveling in the guide rail 6 and the current collector shoes 11a.

Figure 2:
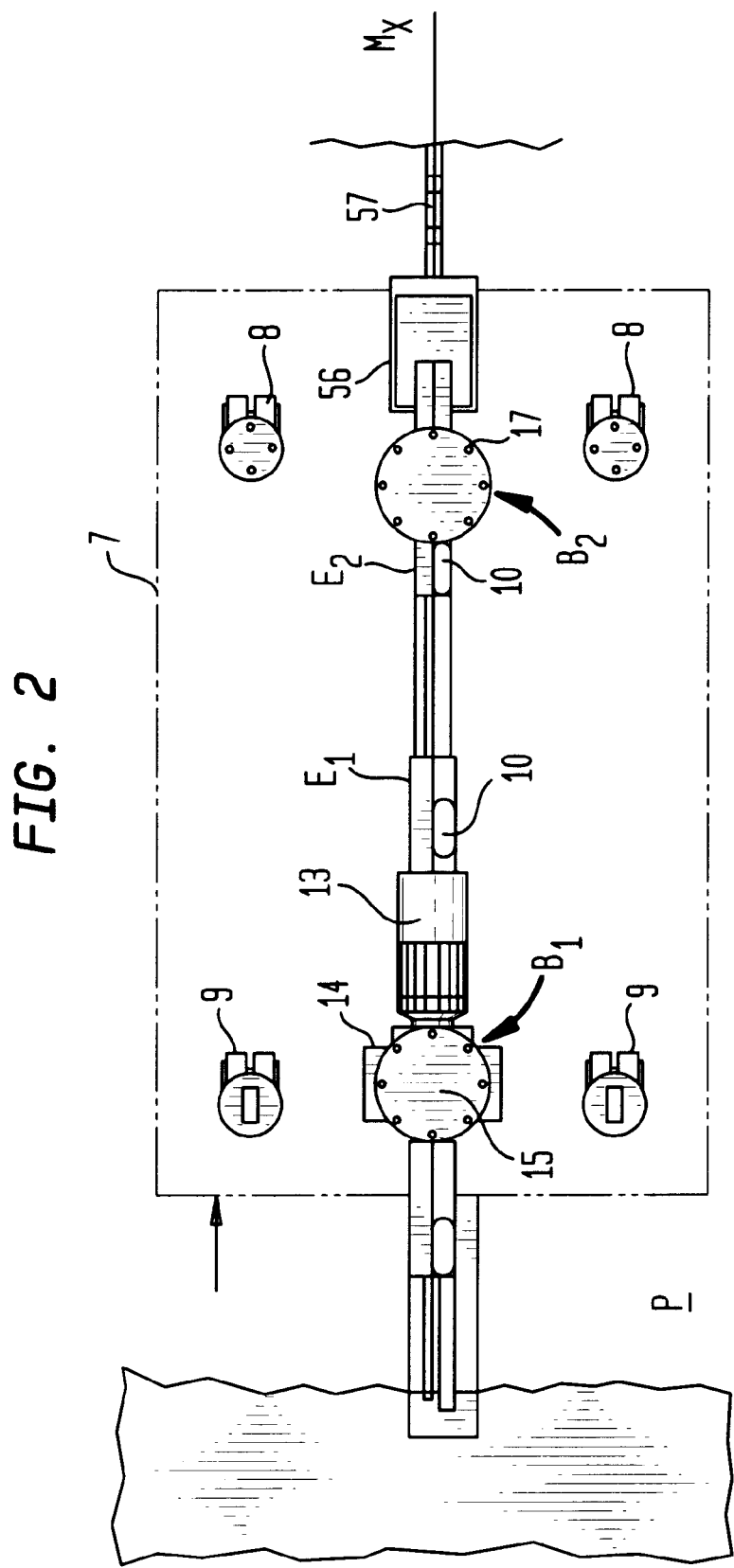
FIG. 2 is a top plan view, on a reduced scale, of the floor transport system.

The floor transport vehicle according to FIG. 4 is more versatile compared to the embodiment shown in FIGS. 1 to 3, and can be used in both travel directions in a shuttle-type operation. This can be advantageous in particular with very heavy workpieces and for difficult operations.

Figure 5:
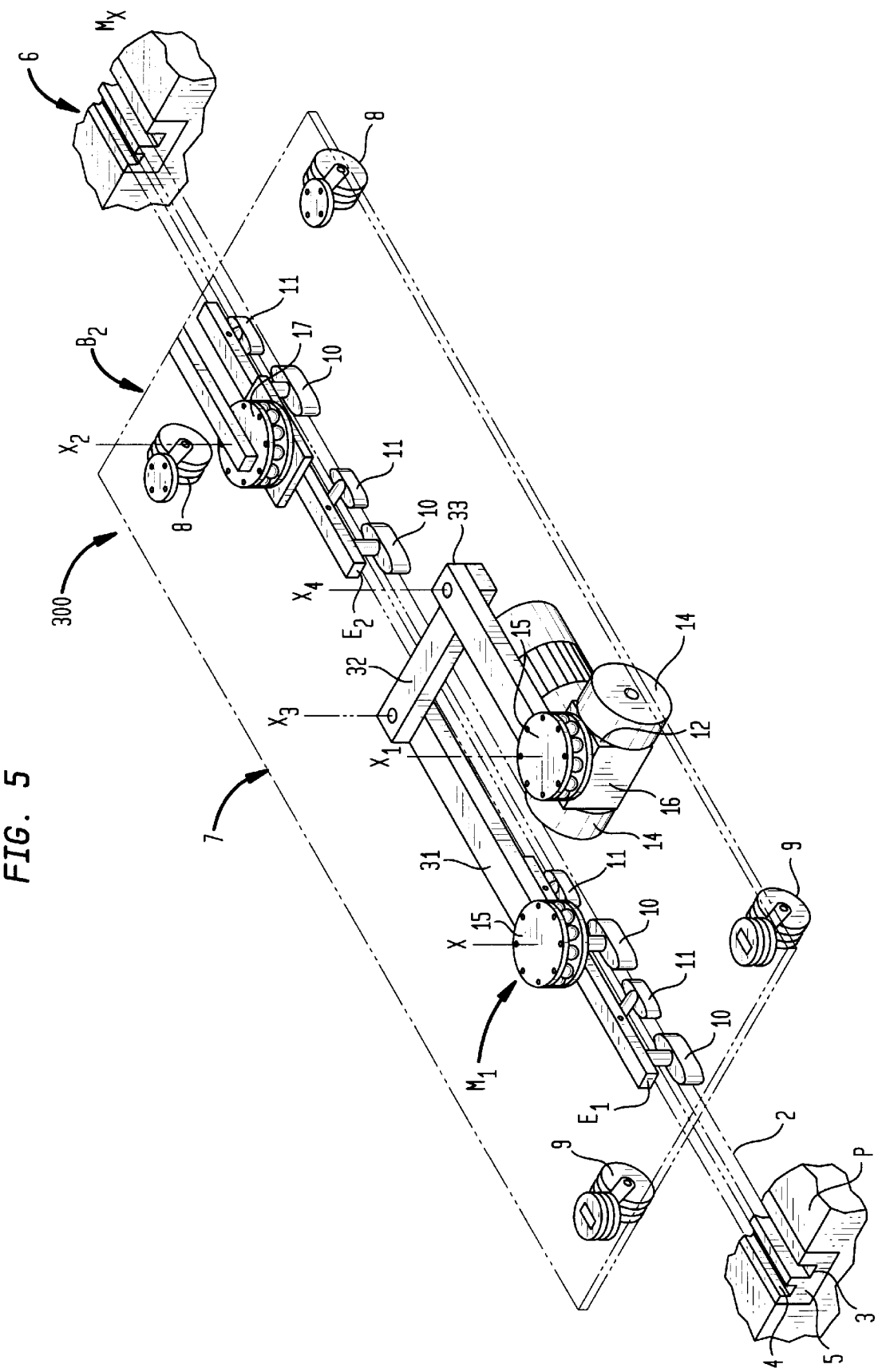
FIG. 5 is a schematic, perspective view of a third embodiment of a floor transport system according to the present invention, having incorporated a drive unit in offset disposition in transverse direction.
Figure 6:
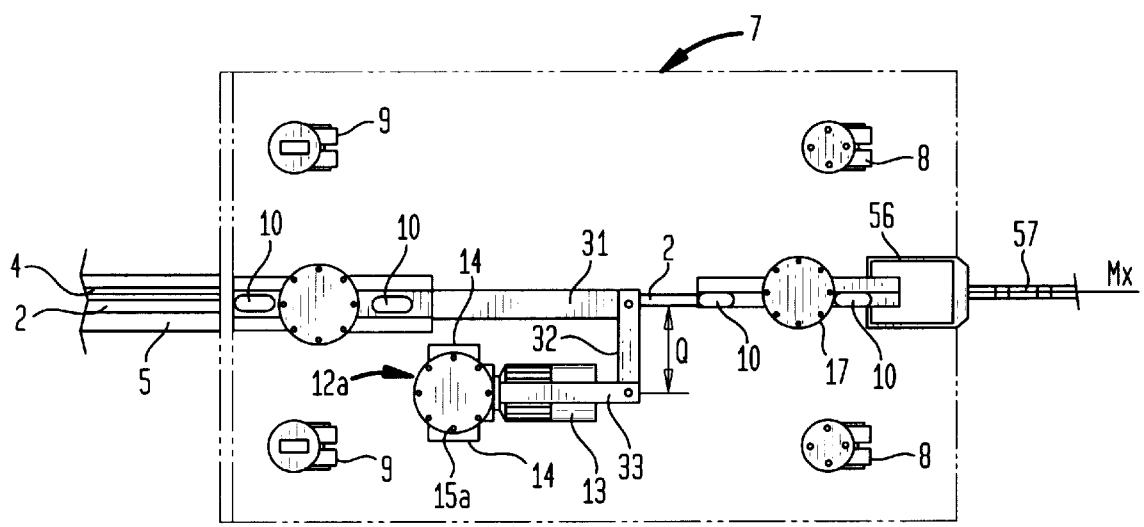
FIG. 6 is a plan view, on a reduced scale, of the floor transport system of FIG. 5.

FIGS. 5 and 6 show a further floor transport system according to the present invention, generally designated by reference numeral 300 and slightly modifying the basic design illustrated in FIGS. 1 to 3. In order to effectively prevent sharp edges of the track channel 2 from damaging the tires of the drive wheels 14, in particular when traveling in the slotted track channel 2 along curved section (at an acute angle), while carrying e.g. heavy loads, the guide and current collector unit $E_1$ of the leading special subassembly $B_1$, which includes the guide elements 10 sliding in the slotted track channel 2 in the longitudinal center axis Mx of the vehicle, is provided with a steering lever 31 which is oriented in opposition to the travel direction and is articulated via a transverse link 32 to a control rod 33. The control rod 33 extends in opposition to the travel direction and is rigidly affixed to a drive unit 12a which is secured to the front section of the vehicle frame 7 and in offset disposition transversely relative to the longitudinal center axis Mx by an amount Q (FIG. 6) and capable of rotating about its vertical support axis $x_2$. The pivot axes of this steering transmission device are designated by reference characters $x_3$ and $x_4$.

This off-center arrangement of the drive unit 12a with the drive wheels 14a has the advantage that these drive wheels 14a can transmit their torque to the entire surface of the floor and ground plane P, without encountering the slotted track channel 2 so that the track slot is prevented from damaging the tires that may occur when traversing the slot with high axle loads.

Figure 7:
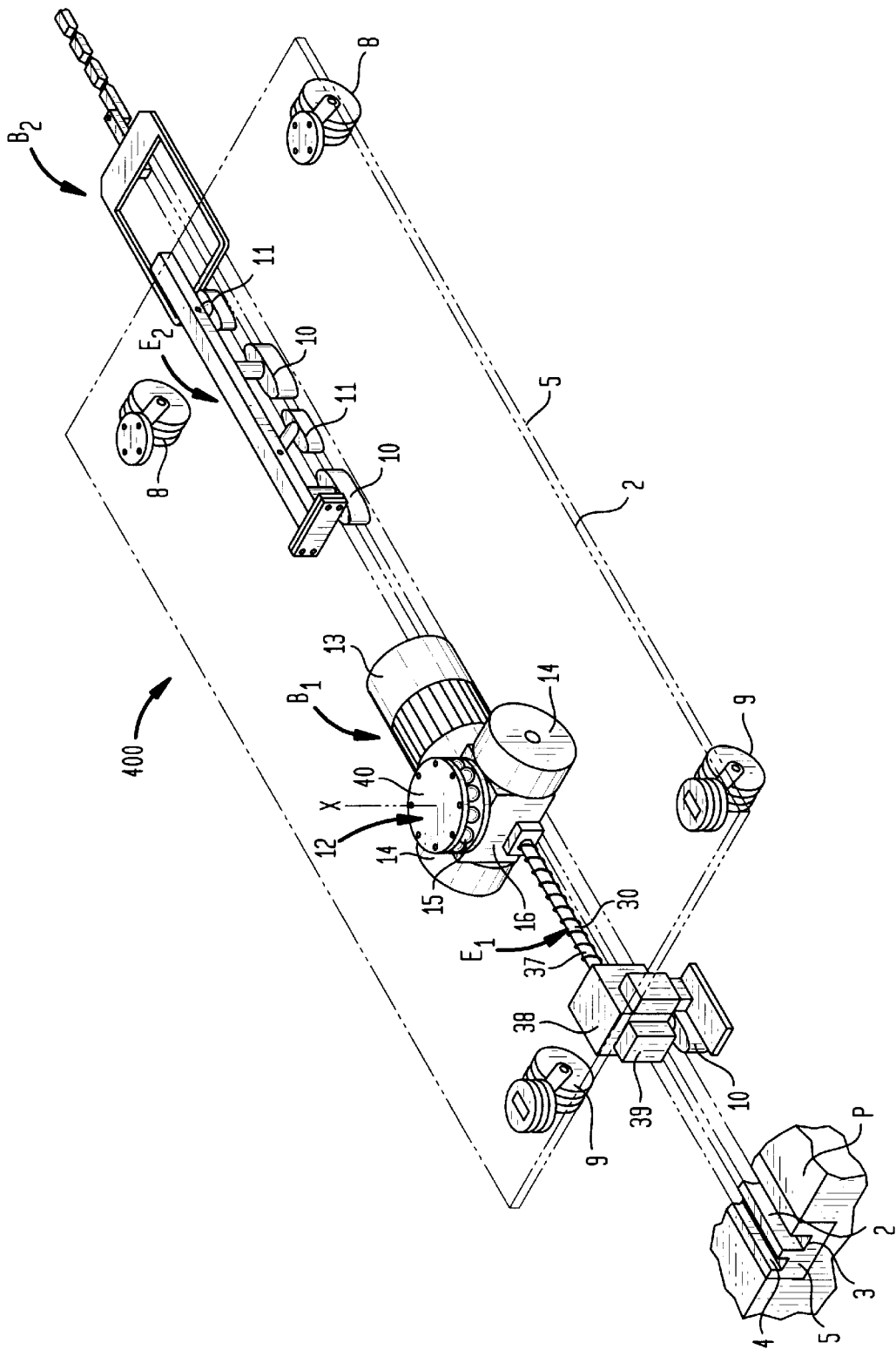
FIG. 7 is a schematic, perspective view of a fourth embodiment of a floor transport system according to the present invention, including a special subassembly located in the longitudinal center axis and having a pole arm extending forwardly in the travel direction.
Figure 8:
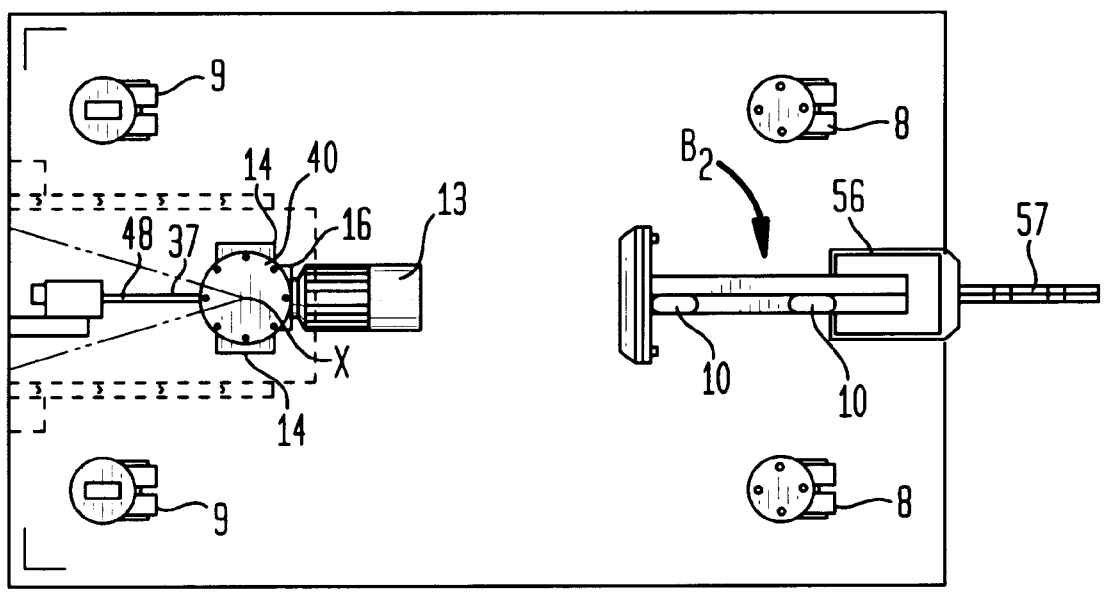
FIG. 8 is a plan view, on a reduced scale, of the floor transport system of FIG. 7.

FIGS. 7 and 8 show another embodiment of a floor transport system, generally designated by reference numeral 400, including leading subassembly $B_1$ with guide and current collector unit $E_1$ in the front section of the vehicle frame 7 and trailing subassembly $B_2$ with guide and current collector unit $E_2$ in alignment with the longitudinal center axis $M_x$, of the vehicle, whereby the guide and current collector unit $E_1$ with its guide elements 10 and current collector shoes 11 includes in addition a pole arm 30 extending forwardly in the travel direction. The front section of the pole arm 30 has at least one guide element 10a slideably guided in the slotted track channel 2 and a proximity sensor 39 disposed on the tip 38 of the pole arm 30 for generating a control signal, before a collision with an obstacle or with a preceding transport vehicle is imminent.

Moreover, the respective forward guide element 10 can be tilted by remote control, as already described above, through drives which are not shown in detail, so that a rail branch line can be controllably selected as travel path when traveling over tongue-less rail switches. For preventing damage in the event of a collision with an obstacle, the tip 38 of the pole arm 30 is able to retract against the bias force of a helical spring 49.

The trailing subassembly $B_2$ on the rear section of the vehicle frame 7 includes the guide and current collector unit $E_2$, with the rear running wheels 8 being disposed on the rear section of the vehicle frame 7.

Figure 9:
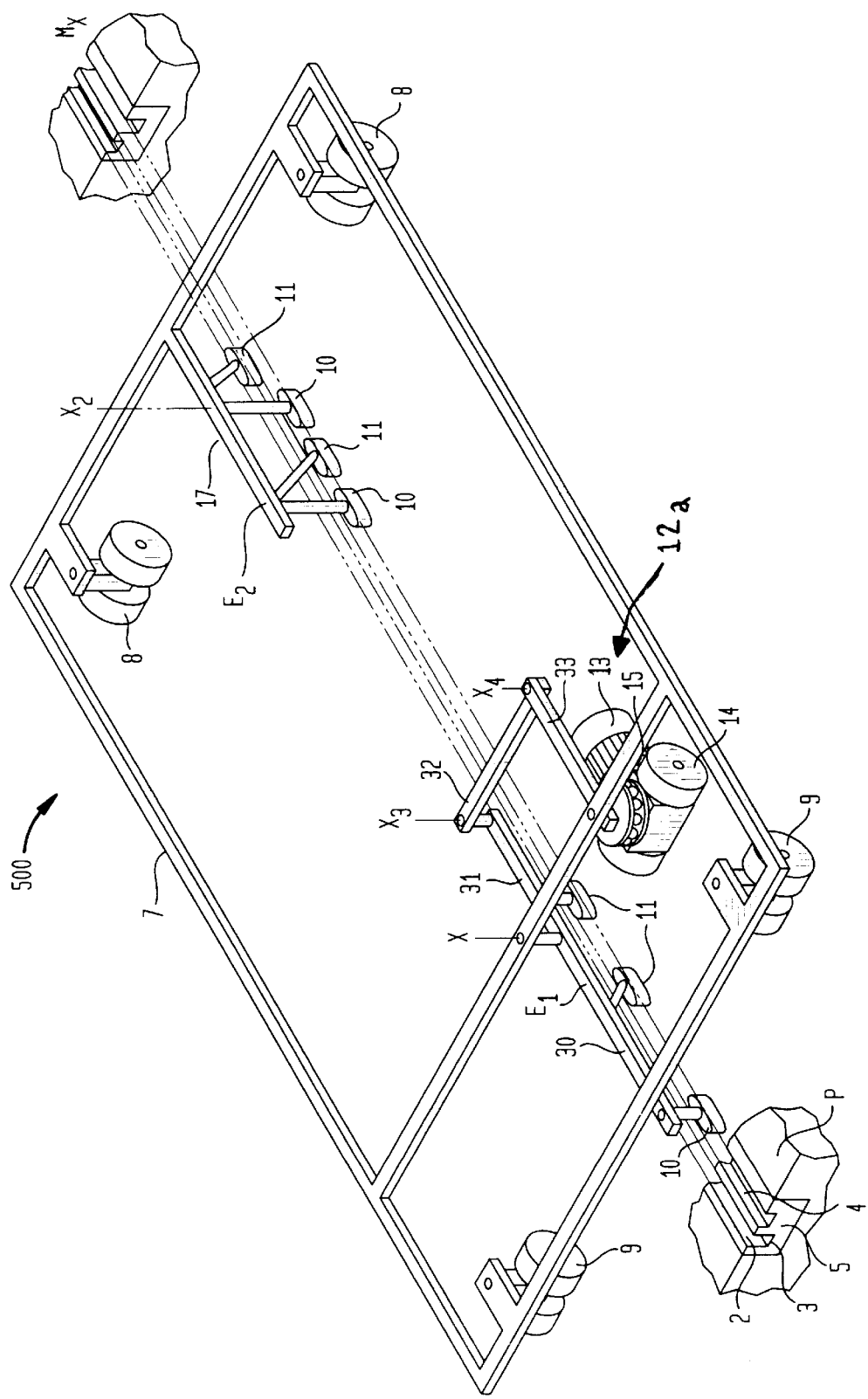
FIG. 9 is a schematic, perspective view of a fifth embodiment of a floor transport system according to the present invention, with a pole arm extending forwardly in the travel direction and a drive unit arranged in offset disposition with respect to the transverse direction.
Figure 10:
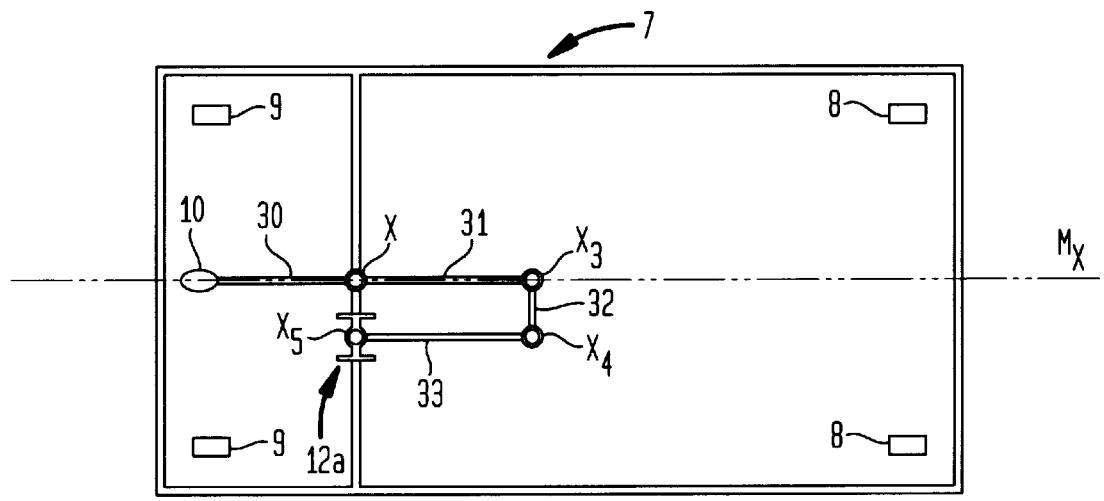
FIG. 10 is a schematic, a top plan view, on a reduced scale, of the floor transport system of FIG. 9 during straight travel path.
Figure 11:
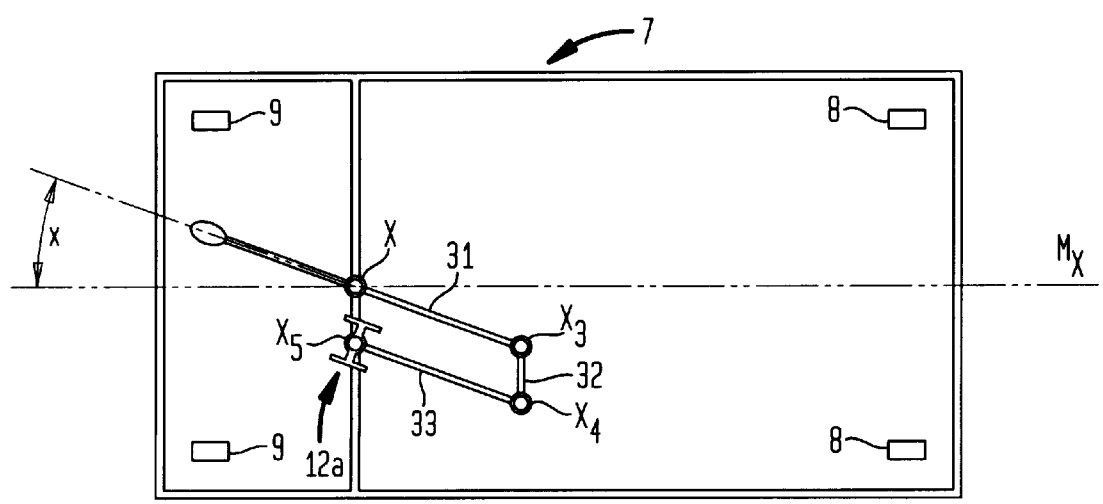
FIG. 11 is a schematic, top plan view, on a reduced scale, of the floor transport system of FIG. 9 during curved travel path.

FIGS. 9 to 11 show a further embodiment of a floor transport system 500 according to the present invention which combines features of the floor transport system 100, shown in FIGS. 1 to 3, with features of the floor transport system 300, shown in FIGS. 5 and 6. The floor transport system 500 includes the front guide and current collector unit $E_1$ which can rotate about the respective vertical steering axis x, and is provided with a pole arm 30 which points forward in the travel direction and is equipped similarly as in FIGS. 7 and 8 so as to be provided with a remote-controllable guide element 10 and the current collector shoes 11.

The travel path can thus advantageously be selected in the manner described before; in this case, however, the design depicted in FIGS. 5 and 6 is implemented. The steering lever 31 which is attached to the guide and current collector unit $E_1$ is articulated to the transverse link 32 for rotation about axis $x_3$ which is swingably mounted for rotation about axis $x_4$ to the control rod 33 that is rigidly connected to the drive unit 12a. The drive unit 12a is laterally offset relative to the longitudinal center axis $M_x$ in transverse direction, thereby attaining the same advantages which have been described above with reference to FIGS. 5 and 6. This steering mechanism is again schematically depicted in FIGS. 10 and 11.

Figure 12:
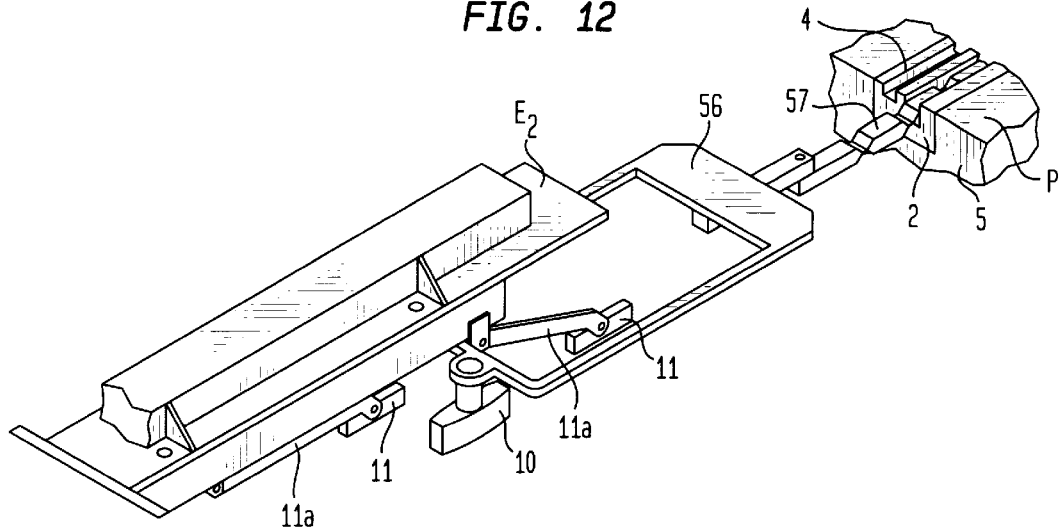
FIG. 12 is a perspective, cutaway view of a rear guide and current collector unit.
Figure 13:
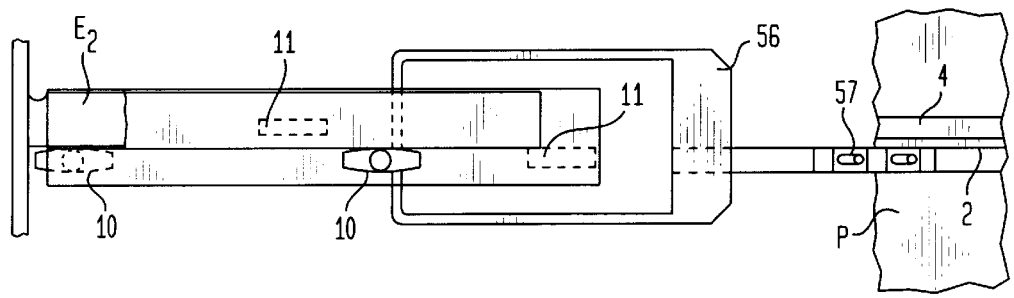
FIG. 13 is a top plan view of the rear guide and current collector unit.

FIGS. 12 and 13 shows a detailed view of the rear guide and current collector unit $E_2$ which includes a swivel frame 56 swingably mounted for rotation about the pivot axis of the rear guide elements 10. Connected to the swivel frame 56 is a plate link chain 57 which runs recessed in the slotted track channel 2 in order to ensure that a minimum separation between two successive floor transport vehicles is maintained.

As shown in FIG. 13, the chain links have oblong holes for allowing lengthwise movement therein of the link pins, so that the length of the chain decreases when pushed together by an obstacle that approaches too closely whereby the chain is prevented from being excessively elevated and thus posing a risk for people and property.

FIG. 14 shows a cutaway front view of the guide rail 6 which includes the slotted track channel 2 embedded into the form body 5 (see also FIG. 12), the current conductor 3 received in the bottom of the slotted track channel 2 as well as the other current conductor 4. This design is seen clearly in the perspective view of FIG.15.

FIGS. 16 and 17 show by way of example possibilities of effecting a vertical adjustability of the running wheels 8. As shown in FIG. 16, secured to the underside of the frame 7 is a hand crank 47 which interacts with an adjustment rod 46 for cooperating with a slotted link mechanism provided in the form of a slider 48 with slanted slots 51 and secured via a mounting to the running wheel 8. Upon actuation of the crank 47, a rotation of the rod 46 causes a displacement of a slider guide 48, thereby effecting a height adjustment of the running wheel 8. In FIG. 17, the slider 48 is remote-controlled by means of a hydraulic cylinder 50 for height adjustment.

A height adjustment of the running wheels or support wheels 9 is advantageous also in the event of a malfunction, for example, if foreign objects trapped under the vehicle have to be removed. In order to prevent the guide elements 10 from scraping along the floor and ground plane P, the vehicle can advantageously also be pushed out of the travel path by disengaging the current collector shoes 11. For example, a lifting device (not shown) that actuates the support of the current collector shoes 11 can be employed for this purpose.

When negotiating turns, the running wheels 8 and the support wheels 9 can be so designed with the help of ball turning units or similar rotary bearings (not shown in detail) so as to turn and self-steer about 360°, as shown in FIGS. 16, 17, since their vertical axes of rotation are located outside the respective support axes of the running wheels 8 or support wheels 9.

While there have been described what at present are considered to be the preferred embodiments of the present invention, it will be readily apparent to those skilled in the art that various changes and modifications may be made therein without departing from the invention, and it is intended in the appended claims to cover such changes and modifications as fall within the true spirit and scope of the invention.

What is claimed as new and desired to be protected by letters patent is set forth in the appended claims:

What is claimed is:

1. A floor transport system arranged on a floor plane; comprising:
    at least one floor transport vehicle including a vehicle frame supported on at least two running wheels and at least one drive wheel for movement on the floor plane in a traveling direction;
    a guide rail system recessed in the floor plane for guiding the transport vehicle along a travel path, said guide rail system having a slotted track defined by a bottom and at least two current conductors, with one of the current conductors being disposed flush with the floor plane;
    a leading subassembly swingably mounted to the vehicle frame for rotation about a first vertical axis and including a guide mechanism which is slidingly received in the track, and a current collector mechanism interacting with the guide mechanism and slidingly contacting the current conductors;
    a trailing subassembly swingably mounted to the vehicle frame for rotation about a second vertical axis and including a guide mechanism which is slidingly received in the track; and
    a first drive unit electrically and mechanically linked to the leading subassembly for propelling the at least one drive wheel.

2. The floor transport system of claim 1 wherein the vehicle frame defines a longitudinal center axis, said leading subassembly and said trailing subassembly being aligned in the center axis on the vehicle frame.

3. The floor transport system of claim 1 wherein the trailing subassembly includes a current collector mechanism for slidingly contacting the current conductors.

4. The floor transport system of claim 1 wherein the first drive unit forms with the leading subassembly a one-piece structural unit.

5. The floor transport system of claim 1 wherein each of the leading and trailing subassemblies is rotatably supported by a ball turning disk for rotation about the vertical axes.

6. The floor transport system of claim 1 wherein the vehicle frame is supported on a second drive wheel, and further comprising a second drive unit electrically and mechanically linked to the trailing subassembly for propelling the second drive wheel.

7. The floor transport system of claim 6 wherein the second drive unit is operatively connected to the trailing subassembly to form a uniform aggregate, said second drive unit including a drive motor for propelling the second drive wheel, a transmission interconnected between the drive motor and the second drive wheel.

8. The floor transport system of claim 1 wherein the vehicle frame defines a center axis, said first drive unit being rotatable about a third vertical axis and linked to the leading subassembly via a steering lever which extends from the leading subassembly in opposition to the traveling direction and is pivoted via a transverse link to a control rod which extends in opposition to the traveling direction and is rigidly affixed to the first drive unit, with the first drive unit being secured to the vehicle frame laterally offset relative to the longitudinal center axis.

9. The floor transport system of claim 8 wherein the extent of lateral offset disposition of the first drive unit relative to the longitudinal center axis is the same as the length of the control arm so that a parallelogram steering system is effected.

10. The floor transport system of claim 9 wherein the running wheels are arranged on both lateral sides in a rearward section of the vehicle frame.

11. The floor transport system of claim 10 wherein the running wheels are adjustable in height.

12. The floor transport system of claim 1 wherein the first drive unit is linked to the leading subassembly via a steering linkage.

13. The floor transport system of claim 1 wherein the leading subassembly includes a pole arm having a front end and extending forwardly in the traveling direction, said pole arm being provided in proximity of its front end with at least one guide element slideably guided in the slotted track channel, and with a proximity sensor for generating a control signal before encountering a potential collision with an obstacle or with a preceding transport vehicle.

14. The floor transport system of claim 1 wherein the guide mechanism includes an elongated slider block rotatable about a vertical axis or laterally displaceable, and provided with a remote-controlled drive for rotation or lateral adjustment.

15. The floor transport system of claim 1 wherein the vehicle frame is further supported on at least two non-driven support wheels arranged on either side of the drive wheel near the lateral boundary of the vehicle frame.

16. The floor transport system of claim 1 wherein the current collector mechanism includes current collector shoes and swivel arms for slidingly contacting the current conductors, said swivel arms slidingly bearing against the current conductors by gravity or spring forces.

17. The floor transport system of claim 1, and further comprising a plate link chain adapted to engage with the slotted track channel.

18. The floor transport system of claim 17 wherein the plate link chain is secured to the vehicle frame.

19. The floor transport system of claim 17 wherein the plate link chain is attached to at least one of the subassemblies.

20. The floor transport system of claim 17 wherein the plate link chain has a rectangular cross section matching the cross section of the travel channel.

* * * * *